United States Patent
Ozawa et al.

(10) Patent No.: US 6,917,488 B2
(45) Date of Patent: Jul. 12, 2005

(54) DATA STORAGE DEVICE, HEAD POSITIONING APPARATUS AND HEAD POSITIONING METHOD

(75) Inventors: Yutaka Ozawa, Fujisawa (JP); Masahide Yamasaki, Fujisawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 321 days.

(21) Appl. No.: 10/251,392

(22) Filed: Sep. 19, 2002

(65) Prior Publication Data

US 2003/0067709 A1 Apr. 10, 2003

(30) Foreign Application Priority Data

Sep. 20, 2001 (JP) .................................. 2001-286861

(51) Int. Cl.[7] ............................................. G11B 5/55
(52) U.S. Cl. ............................. 360/78.04; 360/78.06
(58) Field of Search ....................... 360/78.04, 75, 360/78.06, 78.07, 78.09, 78.14

(56) References Cited

U.S. PATENT DOCUMENTS

| | | | | |
|---|---|---|---|---|
| 5,901,009 A | * | 5/1999 | Sri-Jayantha et al. | 360/78.04 |
| 5,999,361 A | * | 12/1999 | Kim | 360/78.04 |
| 6,031,684 A | * | 2/2000 | Gregg | 360/78.06 |
| 6,115,205 A | * | 9/2000 | Waugh et al. | 360/78.06 |
| 6,118,616 A | * | 9/2000 | Jeong | 360/78.07 |
| 6,153,997 A | * | 11/2000 | Kobayashi et al. | 360/75 |
| 6,178,060 B1 | * | 1/2001 | Liu | 360/78.04 |
| 6,545,838 B1 | * | 4/2003 | Burton | 360/78.07 |
| 6,597,528 B1 | * | 7/2003 | Pang et al. | 360/78.04 |
| 6,765,747 B1 | * | 7/2004 | Sun et al. | 360/77.04 |

FOREIGN PATENT DOCUMENTS

JP    2002150732 A  *  5/2002

* cited by examiner

Primary Examiner—David Hudspeth
Assistant Examiner—James L Habermehl
(74) Attorney, Agent, or Firm—Ronald B. Feece; Lewis L. Nunnelley

(57) ABSTRACT

A method and apparatus for resolving a "continuity" problem that occurs when modes are switched in the head positioning control process, and a contradiction exists between a short seek and a long seek.

1 Claim, 14 Drawing Sheets

Settling mode (settling mode, position – velocity control)

$u(n) = K1*y(n) + K2*\{y(n)-y(n-1)\} + K3*u(n-1) + K4*u(n-2)$ $u(n) = G * [ K1*y(n) + K2*\{y(n)-y(n-1)\} ] + K3*u(n-1) + K4*u(n-2) + Ki*i(n)$
$i(n) = i(n-1) + y(n)$ deltat = target position − current position trk_len = target position
− initial position when seek request occures

DATA STORAGE DEVICE, HEAD POSITIONING APPARATUS AND HEAD POSITIONING METHOD

BACKGROUND OF THE INVENTION

1. Field of the Invention

The present invention relates to a data storage devices such as a hard disk drive, and relates in particular to controlling the position of the head of the data storage device when reading or writing data.

2. Background Art

A hard disk drive is one of the most popular external storage devices available for computers. As is well known, the surface of a magnetic disk that serves as a storage medium for a hard disk drive is divided into tracks that have the appearance of the rings of a tree, and each track is further radially divided into sectors that serve as the minimum data recording units. As a result, the linear recording density increases the nearer a track is to the outer circumference of the magnetic disk. Therefore, for the zoned bit recording method that is currently the primary data recording method for a magnetic disk, all the tracks are grouped into a number of zones, and a constant linear recording density is defined for each zone. Then, since the length of a sector is generally 512 bytes, the number of sectors increases the nearer a track is to the outer circumference of the magnetic disk.

A hard disk drive has magnetic heads for reading data from a magnetic disk, or for writing data thereto. These magnetic heads are mounted on an actuator mechanism that is driven by a VCM (Voice Coil Motor).

When a magnetic head reads or writes data, the actuator mechanism is driven and moves and positions the magnetic head above a predetermined track. For the moving and the positioning of the magnetic head at a predetermined location, servo information recorded on the magnetic disk is employed.

The positioning control provided for the magnetic head is exercised by switching among three modes, a seek mode, a settling mode and a following mode, in accordance with the distance between the current position of the magnetic head and the target position to which the magnetic head should be moved.

For example, when a seek request is issued to move the magnetic head to a target position while the head is located at X, as is shown in FIG. 2, the positioning of the magnetic head is performed by setting in order the seek mode, the settling mode and the following mode. It should be noted that the vertical axial direction in FIG. 2 represents distance and that the horizontal axial direction represents time, and that the movement of the magnetic head, which begins with the seek mode, is called a long seek. When a seek request for moving the magnetic head is issued while the head is located at Y, which is nearer the target position than is X, positioning control is exercised by setting in order the settling mode and the following mode. The moving of the magnetic head beginning with the settling mode is called a short seek. In FIG. 2, the seek mode is selected when the distance between the current position of the magnetic head and the target position exceeds distance B, the settling mode is selected when the distance between the two points is greater than distance A and less than distance B, and the following mode is selected when the distance between the two points is equal to or less than distance A.

The seek mode is a control mode wherein the velocity of a head is calculated based on the distance to a target position so as to follow up with the movement of the head. The settling mode is the feedback control based on the distance to the target position and the velocity. The following mode is the control obtained by employing an integrator for the settling mode. As is described above, since the control method differs in these modes, the feedback parameter also differs.

Since the feedback parameter is suddenly changed when the control modes are switched, it has been pointed out that during this switching process the action of a position control current becomes unnatural. This problem is called a "continuity" problem.

FIG. 12 is a graph illustrating the "continuity" problem. The graph shows the velocity and the position of a head and a current (DAC out) supplied to an actuator for moving the head during a seek process performed for a hard disk drive. In FIG. 12, when the seek mode is changed to the settling mode, the current DAC out is changed greatly. The great change in the current DAC out causes acoustic noise, and also increases the seek time.

It is further understood that a contradiction occurs when the feedback parameter in the settling mode is employed both for a long seek, performed in the seek, settling and following mode order, and for a short seek, which begins with the settling mode. This is because the initial velocity that is set when the settling mode is entered differs between a long seek and a short seek. That is, during a long seek the head enters the settling mode at a specific initial velocity, while in the short seek, the initial velocity is zero.

Naturally, when the head enters at an initial velocity, the feedback gain for a controller will be smaller than when the initial velocity of the head is 0. Therefore, when the feedback parameter in the settling mode is adjusted to an optimal value during a short seek (when the initial velocity is 0), the head will overshoot during a long seek. And when the parameter in the settling mode is adjusted for a long seek, in a short seek the gain will not be sufficient and the head will undershoot a track. This is a contradiction. In order to resolve this contradiction, according to one method that is employed two settling parameters are used during a long seek and a short seek; however, this method has not been successful.

SUMMARY OF THE INVENTION

The present invention advantageously resolves the "continuity" problem that arises when modes are switched, and to resolve the contradiction existing between a short seek and a long seek. The present invention provides a compensation method for multiplying a feedback parameter during a long seek in the settling mode by a gain compensation coefficient. When a coefficient that is varied in accordance with the distance to a target position has been employed as a gain compensation coefficient, both the long seek characteristic and the short seek characteristic could be improved, the contradiction could be resolved, and the frequency at which the "continuity" problem occurred could be reduced.

To achieve the above object, according to the present invention, a data storage device comprises: a data storage medium, storing data; a head, writing and reading data at a predetermined access position on the data storage medium; and a positioning controller, exercising feedback control to move and position the head at the access position, and changing a gain for the feedback control in accordance with the distance between the position of the head and the access position. When the gain is appropriately changed, the occurrence of the "continuity" problem can be prevented, and a contradiction, such as an overshoot and an undershoot, can be resolved.

As is described above, the object of the present invention is the resolution of an inconvenient condition that occurs when the seek mode for a long seek is shifted to the settling mode. And, as will be described later, the settling mode is executed by performing a position-velocity feedback control. Therefore, it is preferable a gain be changed by the positioning controller of the invention while exercising the position-velocity feedback control based on the distance between the position of the head and the access position and on the current velocity of the head. Further, according to the invention, it is preferable that the positioning controller compensate for the gain while exercising the position-velocity feedback control provided following the velocity feedback control that is based on a target velocity defined in accordance with the distance between the head and the access position.

According to the present invention, the gain need not be changed for all the periods during which the settling mode should be employed, and need only be changed within a predetermined period of time following the initiation of the position-velocity feedback control.

Even for long seeks, the distances heads are moved differ. These differences appear in the velocities attained by heads when the distances moved correspond to the distance B. For the present invention, originally, the gain is changed because the velocity of a head at a distance equivalent to that of the distance B differs for a long seek and a short seek. Therefore, the gain need not always be changed even for long seeks. According to the present invention, the positioning controller of the invention alters a gain for a case where, when a seek request is received, the initial position of the head is apart from the access position at a predetermined distance or farther.

Further, according to the present invention the above object is achieved by employing the following data storage device. The data storage device comprises: a storage medium, storing data; a head, seeking the storage medium and accessing a predetermined track; a positioning controller, outputting a control current for positioning the head, based on a first mode that is applied when a distance between the head position and the access position exceeds a distance B, a second mode that is applied when the distance is greater than distance A (A<B) and is equal to or less than the distance B, and a third mode that is applied when the distance is equal to or less than the distance A; and a motor for positioning the head based on the control current output by the positioning controller.

According to the invention, when the distance between the initial position of the head and the access position is greater than the distance B but is less than or equal to a distance C (B<C), the positioning controller positions the head using the first mode, the second mode and the third mode order. When the distance between the initial position of the head and the access position is greater than the distance C, the positioning controller positions the head in accordance with the first mode, a compensated second mode, the second mode and the third mode order.

The data storage device of the invention compensates for the second mode by reducing the fluctuations between a first control current output in the first mode and a second control current output in the second mode.

The contents of the compensation for the second mode can be changed in accordance with the position of the head, because the appropriate positioning control is exercised in accordance with the positioning of the head. Furthermore, according to the invention, the compensated second mode can be applied for a range wherein the distance from the head to the access position is equal to or less than the distance B but is greater than ½ of the distance B.

According to the invention, the compensation is performed for the second mode. The second mode is set on the assumption that, when an access instruction is received, the head will be located at a range greater than the distance A and equal to or less than the distance B. In this case, it is preferable that the compensated second mode be obtained by compensating for the second mode so as to reduce the overshooting of the head.

According to the present invention, a head positioning apparatus that can be applied for the above described data storage device is provided. An apparatus, which positions a read/write head that accesses a predetermined track on a storage medium on which data is stored, comprises: a determination unit, when an access by the read/write head of a predetermined track is requested, determining whether a head-accessed track distance between the position of the read/write head and the predetermined track exceeds a threshold value that has been determined in advance; and a control current output unit, outputting a control current for positioning the read/write head, wherein, based on determination results obtained by the determination unit, the control current output unit either exercises feedback control using a predetermined parameter or by multiplying the predetermined parameter by a gain compensation coefficient, and outputs the control current for positioning the read/write head.

According to the head positioning apparatus of the invention, when the head-accessed track distance is equal to or less than the threshold value, the control current output unit exercises feedback control using a predetermined parameter and outputs the control current for positioning the read/write head, or, when the head-accessed track distance is greater than the threshold value, the control current output unit exercises feedback control by multiplying the predetermined parameter, using the gain compensation coefficient, and outputs the control current for positioning the read/write head. The feedback control is performed by the circuits and equations shown in FIGS. 3 to 5. Therefore, feedback control based on a predetermined parameter, or feedback control provided by multiplying a predetermined parameter by a gain compensation coefficient, includes a process performed based on these circuits and equations.

According to the head positioning apparatus of the invention, the control current output unit can change the gain compensation coefficient in accordance with the distance between the current position of the read/write head and the predetermined track. As was previously described, the head positioning apparatus of the invention compensates for a part of the settling mode using the gain compensation coefficient. Therefore, when the control current output unit has output the control current through the feedback control, by multiplying the gain compensation coefficient, the control current output unit can exercise feedback control using the predetermined parameter and can output the control current.

One aspect of the invention is that it provides a method for positioning a read/write head that accesses a predetermined track on a storage medium on which data is stored. The head positioning method comprises the steps of: when an access by the read/write head of a predetermined track is requested, determining whether a head-accessed track distance between the position of the read/write head and the predetermined track exceeds a threshold value that has been determined in advance; and based on the determination results, deciding either to exercise feedback control using a predetermined parameter, or to exercise feedback control obtained by compensating for the feedback control based on the predetermined parameter, so as to output a control current for positioning the read/write head.

The compensated feedback control is a feedback control provided by multiplying the predetermined parameter by a gain compensation coefficient. When the head-accessed track distance is equal to or less than the threshold value, the control current for positioning the read/write head is output through the feedback control based on the predetermined parameter. When the head-accessed track distance is greater than the threshold value, the control current for positioning the read/write head is output under the feedback control by multiplying the predetermined parameter by the gain compensation coefficient.

DETAILED DESCRIPTION OF THE PREFERRED EMBODIMENTS

Figure 1:
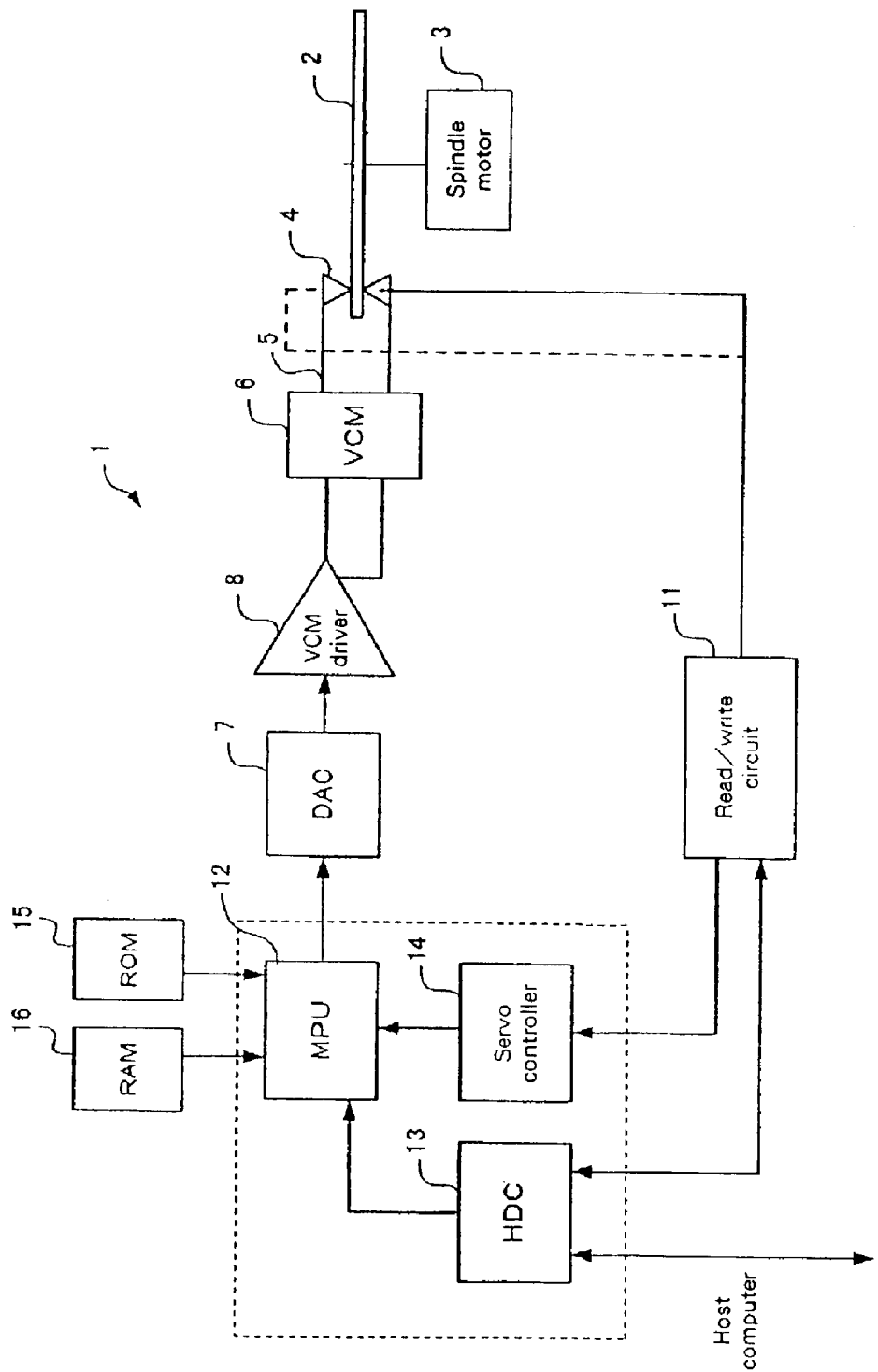
FIG. 1 is a block diagram showing the essential configuration of a hard disk drive according to one embodiment of the present invention.

A preferred embodiment of the present invention will now be described in detail by employing a hard disk drive as an example. FIG. 1 is a block diagram showing the essential portion of a hard disk drive 1. The hard disk drive 1 is a data storage/reproduction apparatus wherein a magnetic head 4 performs a seek operation for a magnetic disk 2 that is driven by a spindle motor 3, and remains at a predetermined track (position) to write data to or to read data from the magnetic disk 2. A single or a plurality of magnetic disks 2 can be mounted, as needed, within the hard disk drive 1, but in this embodiment, only one magnetic disk 2 is so employed.

When the hard disk drive 1 is operated, the magnetic disk 2 is rotated around the spindle shaft of a spindle motor 3, and when the hard disk drive 1 is not being operated, the rotation of the magnetic disk 2 is halted. On the surface of the magnetic disk 2, multiple position data (servo information) storage areas are formed in the radial direction, and data storage areas are formed in other areas. The position of the magnetic head 4 can be ascertained when the magnetic head 4 reads the servo information, which includes track identification data and a burst pattern. The track identification data represents the track address of each data track. When the magnetic head 4 reads the track identification data, the track whereat the magnetic head 4 is currently located can be determined. The burst pattern is formed, in the radial direction of the magnetic disk 2, by arranging at predetermined intervals multiple signal storage areas having differing phases. Based on the signal output for the burst pattern, the distance the magnetic head 4 is shifted from the data track can be determined.

At the distal end of an actuator 5, the magnetic heads 4 are held in consonance with the obverse and reverse faces of the magnetic disk 2. The magnetic head 4 reads data from and writes data to the magnetic disk 2, and also reads servo information from the magnetic disk 2. The magnetic head 4 is moved with the actuator 5 in the radial direction of the magnetic disk 2. A lamp (not shown) is located outside the magnetic disk 2, so that the head can be retracted thereto when the magnetic head 4 is not driven.

A read/write circuit 11 performs data reading/writing. That is, write data transferred by a host computer via an HDC 13 is converted into a write signal (current), and the write signal is transmitted to the magnetic head 4. Based on the write current, the magnetic head 4 writes data to the magnetic disk 2. Further, the magnetic head 4 converts a signal (current) read from the magnetic disk 2 into digital data, and outputs the digital data to a host computer via the HDC 13. The servo information is also included in the digital data.

The servo controller 14 extracts servo information from the data that is output by the read/write circuit 11, and as was described above, the servo information includes track identification data and a burst pattern. The servo controller 14 then transfers the extracted servo information to an MPU (Micro Processing Unit) 12.

The actuator 5 is driven by a voice coil motor (VCM) 6, and it can therefore be said that the VCM 6 drives the magnetic head 4. The VCM 6 is constituted by a movable element having as an element a coil and as an additional element a fixed element having a permanent magnet. When a predetermined current is supplied to the coil by a VCM driver 8, the movable element is driven and the magnetic head 4 is moved to, or halted at, a predetermined position on the magnetic disk 2.

The HDC (hard disk controller) 13 serves as an interface for the hard disk drive 1. As one of the functions of an interface, the HDC 13 receives write data from the host computer, and transmits this write data to the read/write circuit 11. The HDC 13 also receives read data from the read/write circuit 11, and transmits the read data to the host computer. In addition, the HDC 13 receives a command from the host computer, and transmits the command to the MPU 12. This command includes a request for a seek performed by the magnetic head 4, and information for a track to which the magnetic head 4 should be moved, i.e., information for a target position.

The MPU 12 controls the hard disk drive 1 and, accordingly, also performs the positioning of the magnetic head 4. The MPU 12 interprets and executes a program stored in a ROM (Read Only Memory) 15 and determines the position of the magnetic head 4 based on servo information received from the servo controller 14, and employs the distance between the position of the magnetic head 4 and the target position to output, to a digital/analog converter (DAC) 7, a control current for positioning the magnetic head 4. The DAC 7 converts the control current received from the MPU 12 into an analog signal (voltage signal), and outputs it to a VCM driver 8. The VCM driver 8 converts the voltage signal received from the DAC 7 into a drive current, and transmits the drive current to the VCM 6.

Figure 2:
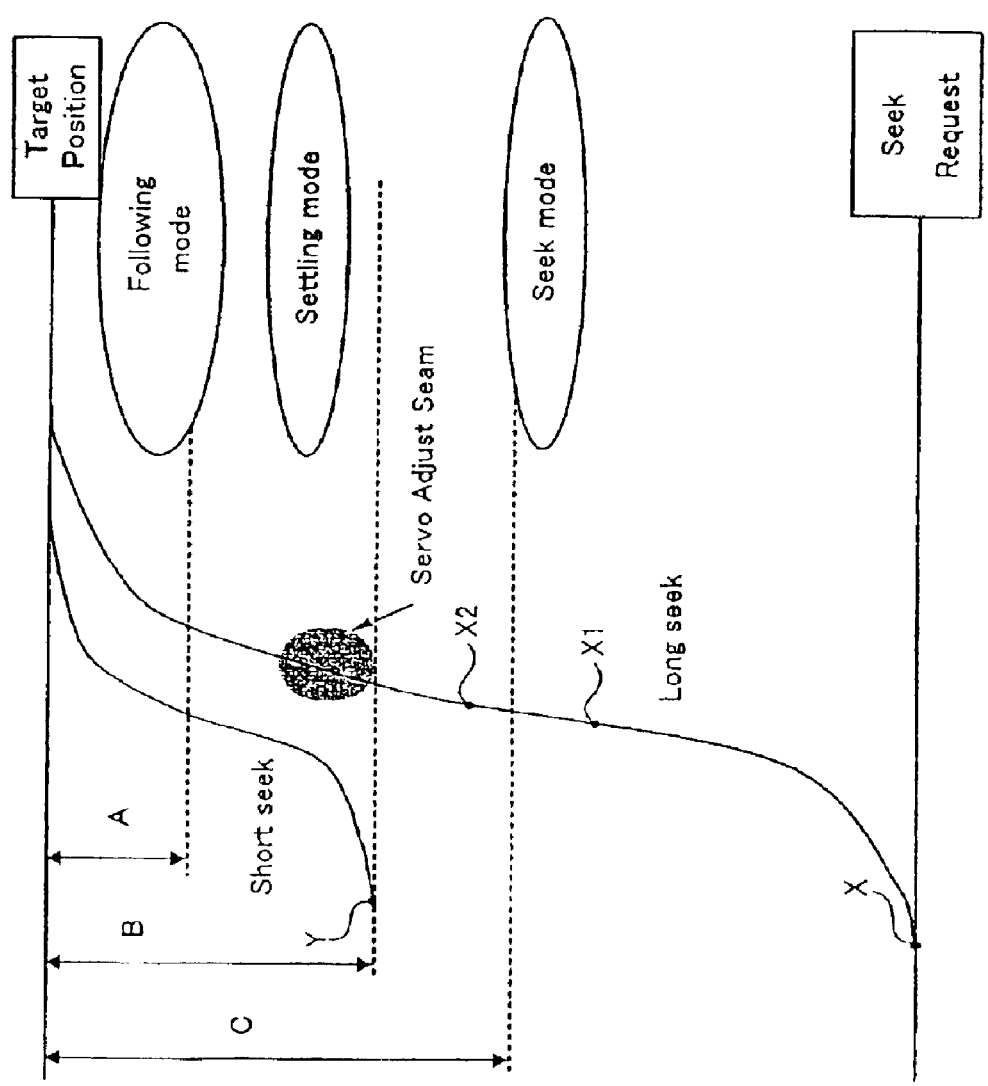
FIG. 2 is a diagram for explaining the mode for the positioning a magnetic head.

According to the embodiment, three modes are used for the positioning of the magnetic head 4 of the hard disk drive 1: a seek mode, a settling mode and a following mode. Further, in this embodiment, for a long seek a gain is compensated for, during a predetermined period of time, immediately after the mode is shifted to the settling mode. As is shown in FIG. 2, when, during a long seek, the distance between the initial position of the magnetic head 4 when the seek request is received and the target position has reached a distance B (the boundary of the settling mode), the seek mode is changed to the settling mode. At this time, when the distance between the current position of the magnetic head 4 and the target position is greater than the distance C, the seek mode is not shifted to the normal settling mode, even though the magnetic head 4 has reached the boundary of the settling mode, and the control for the settling mode is performed while the gain is compensated for. This distance C is used as a threshold value for determining whether the compensated settling mode should be applied. The control for the compensated settling mode is continued during a period of time indicated by the Servo Adjust Seam in FIG. 2. Thereafter, the mode is shifted to the normal settling mode, and when the distance between the current position of the magnetic head 4 and the target position has reached the distance A, the settling mode is shifted to the following mode.

When, during a long seek, the distance between the initial position of the magnetic head 4 when the seek request is received and the target position is equal to or less than the distance C, or in the case of a short seek, the control is not exercised, in the settling mode, with the gain being compensated for, either the seek mode is shifted to the normal settling mode or direct control in the settling mode is performed.

Figure 3:
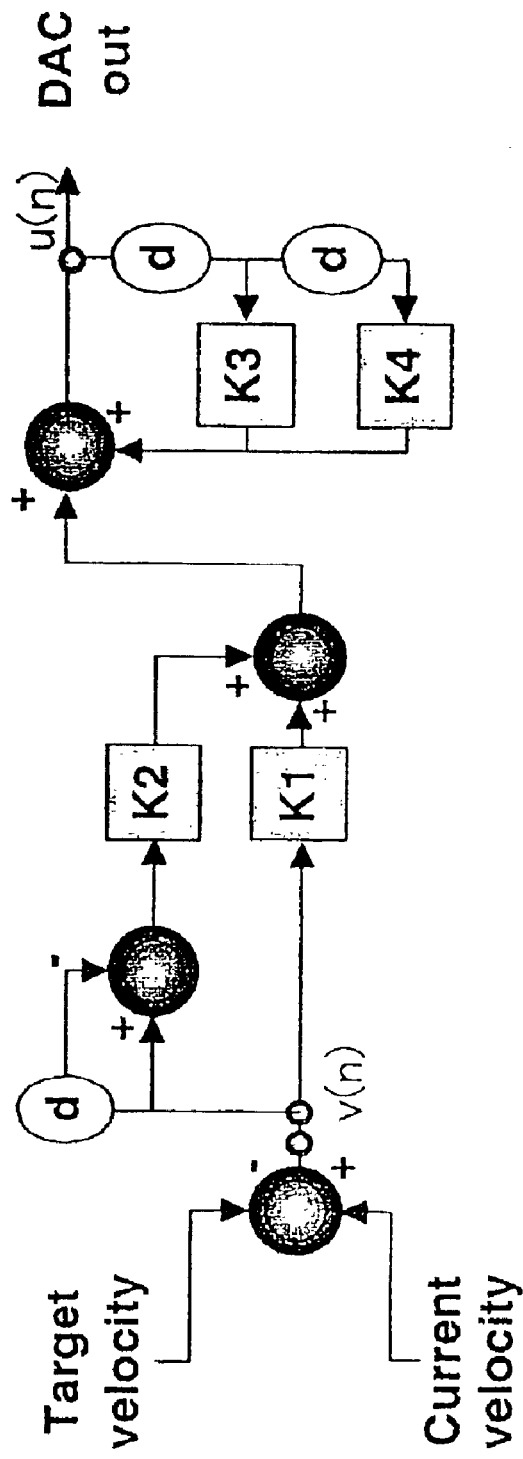
FIG. 3 is a diagram showing the structure for the feedback control in a seek mode.

The MPU 12 exercises feedback control in the above mode based on the current position data for the magnetic head 4 obtained from the servo controller 14 and the information for the target position obtained from the HDC 13, and the information read from the RAM 16. The structure of the servo controller 14 in the seek mode is shown in FIG. 3. As is shown in FIG. 3, the seek mode is the feedback velocity control that makes the current velocity of the magnetic head 4 follow the target velocity. In FIG. 3, u(n) indicates a current positioning control (DAC out) that is output to the DAC 7 in the seek mode.

Figure 4:
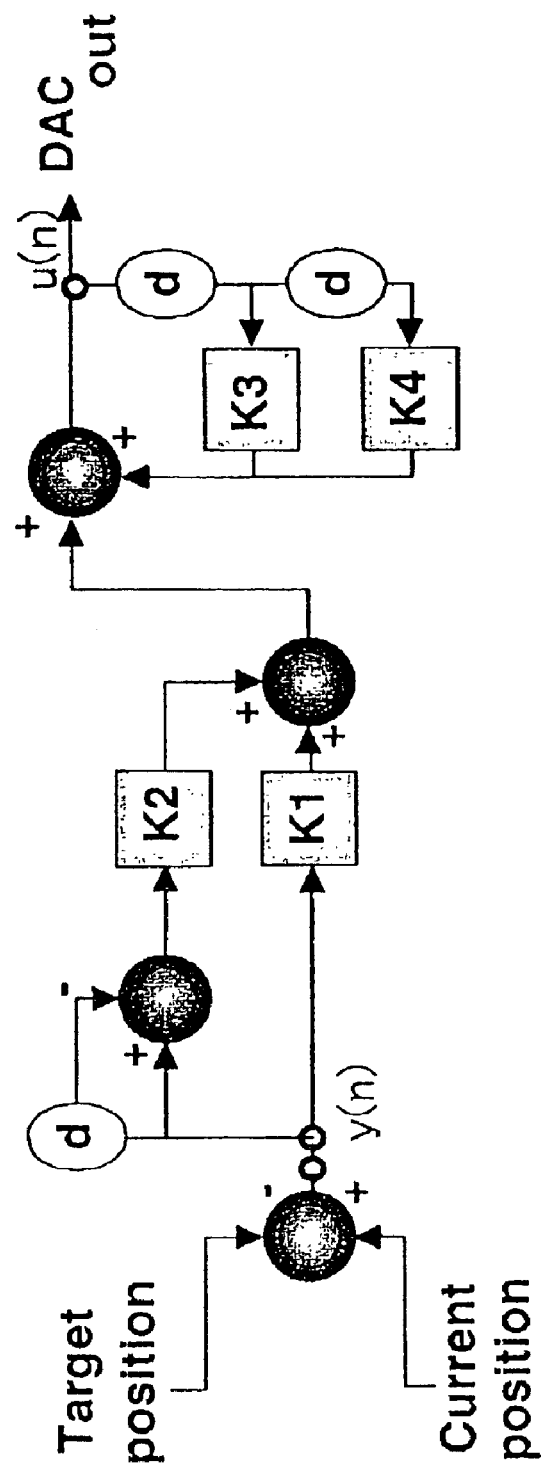
FIG. 4 is a diagram showing the structure for the feedback control in a settling mode.

The structure of the feedback control in the settling mode is shown in FIG. 4. As is shown in FIG. 4, the settling mode provides position-velocity control for the feedback for the distance between the current position of the magnetic head 4 and the target position, and the current velocity. In FIG. 4, u(n) indicates the control current DAC out that is output to the DAC 7 in the settling mode.

Figure 5:
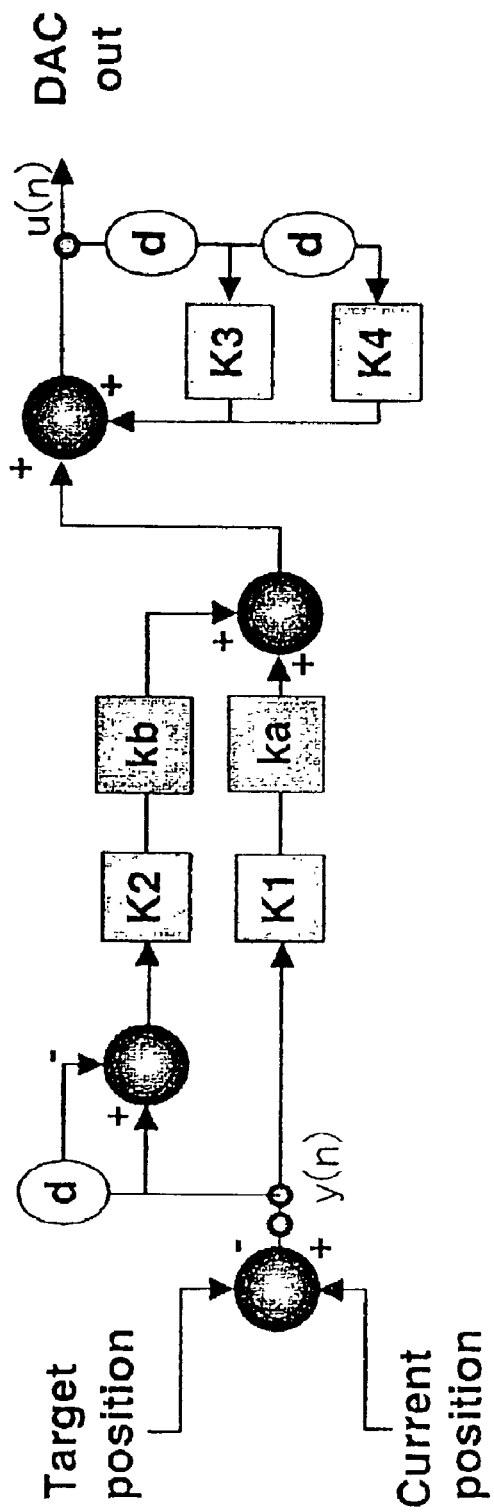
FIG. 5 is a diagram showing the structure when gain compensation is provided for feedback control in the settling mode.

In FIG. 5 is shown the structure for the feedback control in the settling mode for which the gain has been compensated for. As is described above, the settling mode is the position-velocity control for the feedback of the distance to the target position for the magnetic head 4 and the current velocity. When this control is simplified, the control current DAC out can be represented as follows.

$$DAC\ out = K1 \times distance + K2 \times velocity$$

According to the subject of the embodiment, the parameters K1 and K2 in this equation are compensated for in order to obtain the maximum performance during a short seek, while for a long seek; the parameters K1 and K2 are compensated for by multiplying the gain compensation coefficients ka, kb, . . . as follows.

$$DAC\ out = ka \times K1 \times distance + kb \times K2 \times velocity$$

Further, based on the idea that the velocity coefficient kb, which can not easily cope with a change in the servo sampling frequency and TPI, is fixed and that satisfactory effects can be obtained only by using the coefficient ka to cope with the change, the following gain compensation method using only the coefficient ka, which is used as the linear function of the distance between the magnetic head 4 and the target position, was attempted. As a result, the "continuity" problem occurring at the mode switching and the contradiction existing between the short seek and the long seek could be resolved, as will be described later.

$$ka = a \times distance + b (a\ and\ b\ are\ arbitrary\ values) \ldots (case\ of\ B/2 < distance < B) ka = 1 \ldots (case\ of\ distance < B/2)$$

Figure 6:
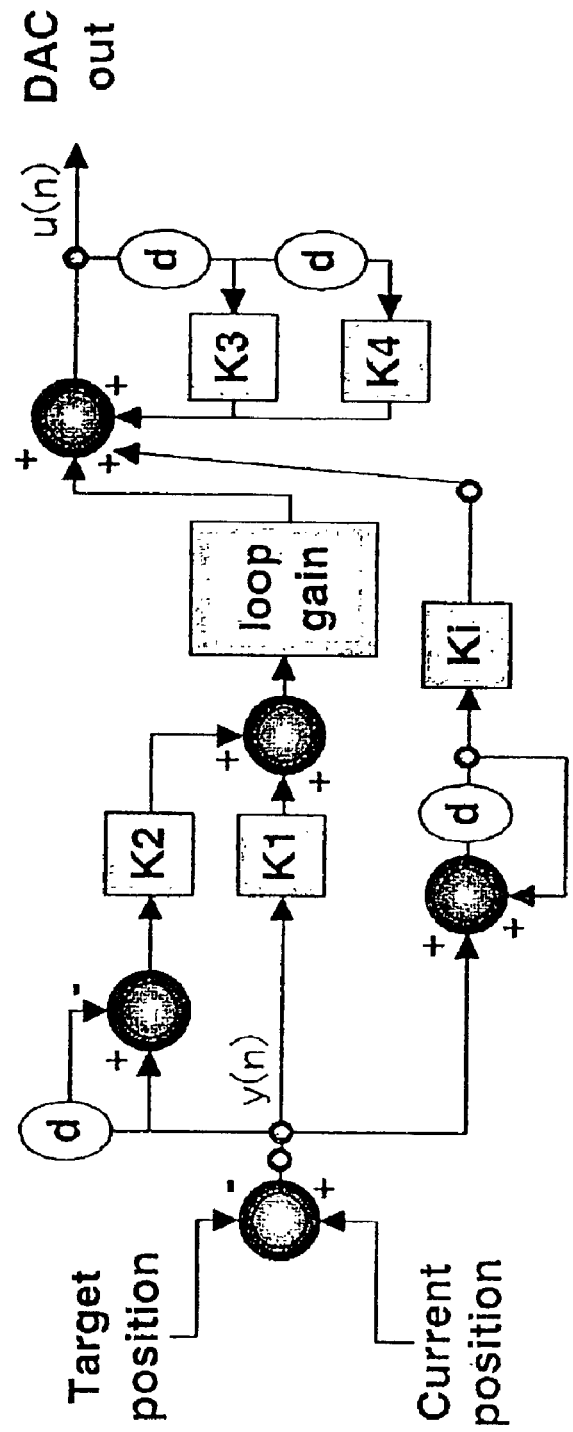
FIG. 6 is a diagram showing the structure by which feedback control is provided for a following mode.

The structure for the feedback control in the following mode is shown in FIG. 6. As is shown in FIG. 6, the following mode is the control exercised with an integrator having been added in the settling mode. In FIG. 6, u(n) indicates a control current DAC out that is output to the DAC 7 in the following mode.

The parameters K1 and K2, used for the feedback control in the seek mode, the parameters K1 and K2, used for the feedback control in the settling mode, and the coefficients ka and kb, used for gain compensation in the settling mode, are stored in the RAM 16. Further, the distances A, B and C from the target position, which are used to establish the seek mode, the settling mode and the following mode, are also stored in the RAM 16. The MPU 12 reads the parameters from the RAM 16, as needed, and calculates the control current DAC out.

The processing performed when a seek request is issued to the magnetic head 4 of the thus arranged hard disk drive 1 will now be described while referring to the flowchart in FIG. 7. When the seek request is issued by the host computer to the magnetic head 4, the target position to which the magnetic head 4 is to be moved is set. This target position is provided by the host computer for the MPU 12 via the HDC 13.

Figure 7:
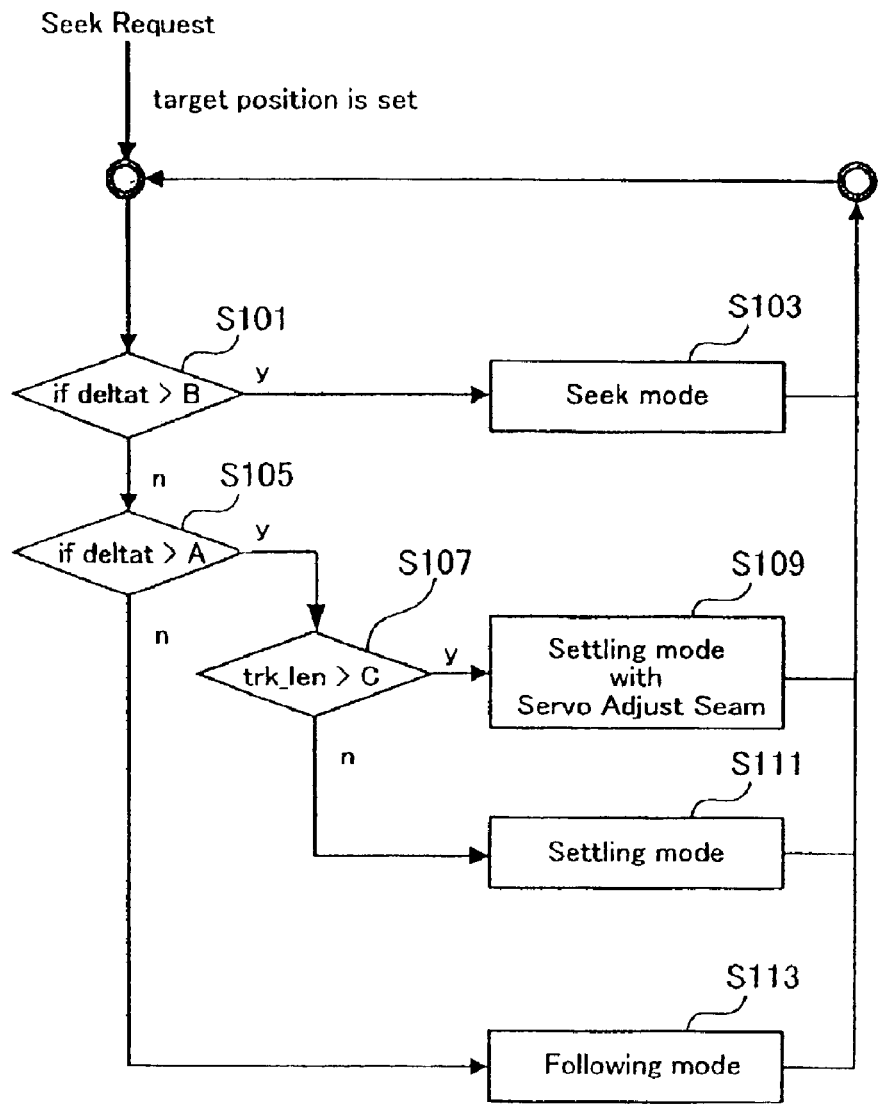
FIG. 7 is a flowchart showing the processing performed to position the magnetic head of the hard disk drive of the embodiment.

The MPU 12 determines whether "deltat", which is defined as the distance from the target position to the current position, is greater than distance "B" (step S101 in FIG. 7). The MPU 12 first calculates "deltat", in accordance with the target position provided by the host and the current position obtained from the received servo information, and then, from the RAM 16, reads "B", which, as is shown in FIG. 2, is a value indicating the boundary between the seek and the settling modes, and compares the two.

When "deltat" is greater than "B", the magnetic head 4 is moved in the seek mode (step S103 in FIG. 7). Control in the seek mode has been explained while referring to FIG. 3. When "deltat" is equal to or smaller than "B", the servo controller 14 determines whether "deltat" is greater than "A" (step S105 in FIG. 7). When "deltat" is greater than "A", program control progresses to step S107. And when "deltat" is equal to or smaller than "A", the magnetic head 4 is moved in the following mode (step S113 in FIG. 7).

At step S107, the MPU 12 determines whether "trk_len" is greater than "C". "trk_len" is the distance between the position of the magnetic head 4 and the target position when a seek request is issued. While referring to FIG. 2, assuming that the magnetic head 4 is located at X1 when a seek request is issued, "trk_len">C is ascertained, and at step S109, the positioning of the magnetic head 4 is performed in the corrected settling mode. Assuming that the magnetic head 4 is located at X2 when the seek request is issued, "trk_len"<C is ascertained, and at step S111 the positioning of the magnetic head 4 is performed in the normal settling mode. That is, depending on whether "trk_len" is greater than C, the corrected settling mode or the normal settling mode is determined to position the magnetic head 4.

As is shown in FIG. 5, the positioning of the magnetic head 4 in the corrected settling mode is performed by compensating for a gain using the compensation coefficient ka in the normal settling mode.

Figure 8:
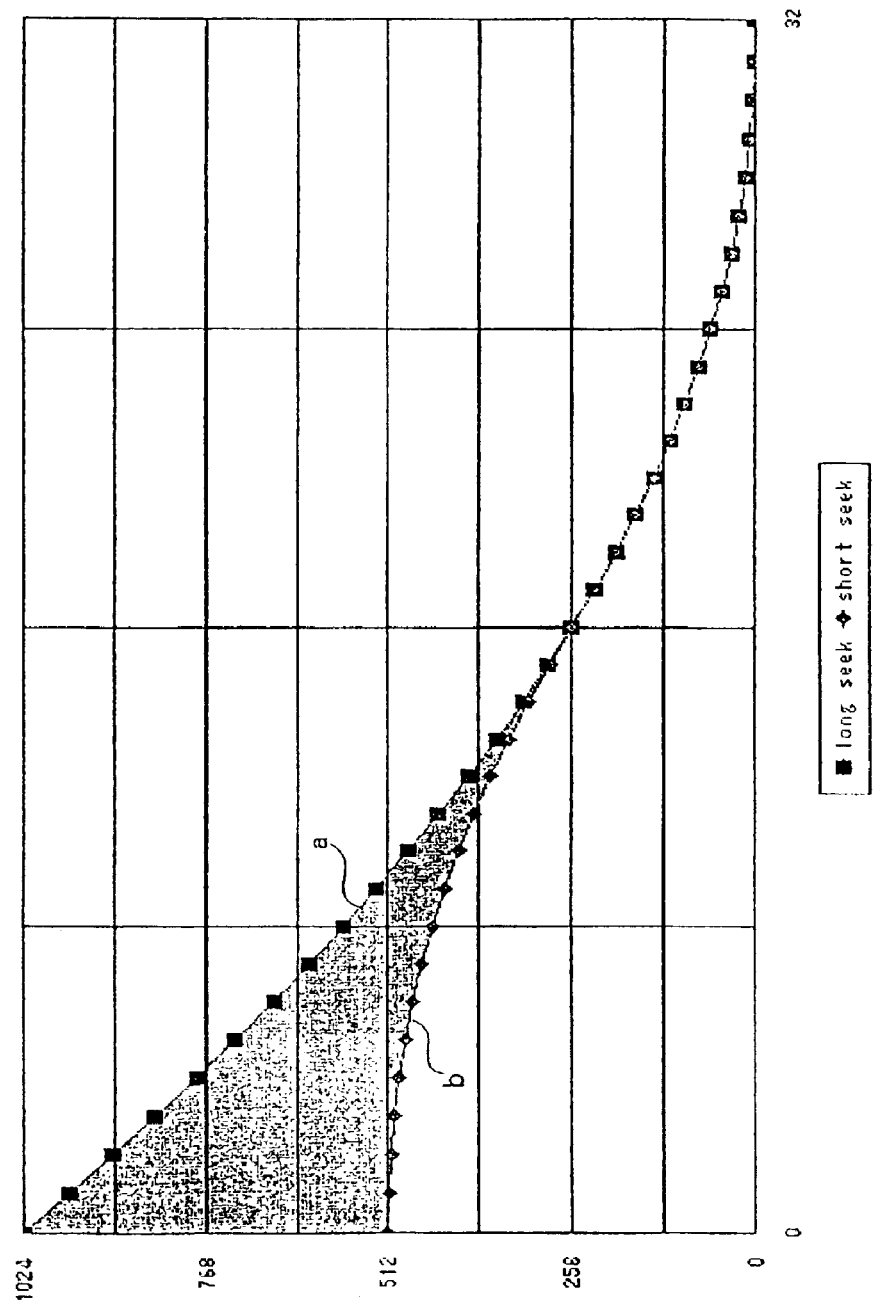
FIG. 8 is a specific graph showing the trajectories of a magnetic head during a long seek and a short seek according to the embodiment.

FIG. 8 is a graph showing ideal trajectories for the magnetic head 4 during a long seek and during a short seek. The horizontal axis represents time and the vertical axis represents the position. The position "0" along the vertical axis represents the target position, and the position "512" represents the boundary of the settling mode. Therefore, "B" is a distance between "0" and "512". A curve b indicates the trajectory of the magnetic head 4 when it is moved from the boundary of the settling mode during a short seek operation. A curve a indicates the trajectory of the magnetic head 4 when it is moved from a position at a distance 2×B from the target position during a long seek operation. The trajectory during the long seek indicates the corrected settling mode.

When a long seek operation is begun, the magnetic head 4 is moved in the seek mode up to the position "512" (see the vertical axis), and is then moved in the corrected settling mode. Control of the magnetic head 4 in the corrected settling mode is provided until the magnetic head 4 reaches position "256" (see the vertical axis), up to the position at distance B/2 from the target position. For gain compensation, a difference between a curve indicating a long seek and a curve indicating a short seek is corrected so that these two curves match at the position following B/2.

This compensation can be optimized using the process for calculating an experimental value a in ka(y(n))=a*y(n)+b in FIG. 5.

An explanation will now be given, while referring to FIGS. 9 to 14, for the results of experiments, for moving the magnetic head 4, that are conducted by changing the settling mode. In FIGS. 9 to 14, the upper graph represents the velocity and the position of the magnetic head 4, and the lower graph represents the control current DAC out. In the upper graph, T.P. indicates the target position.

Figure 9:
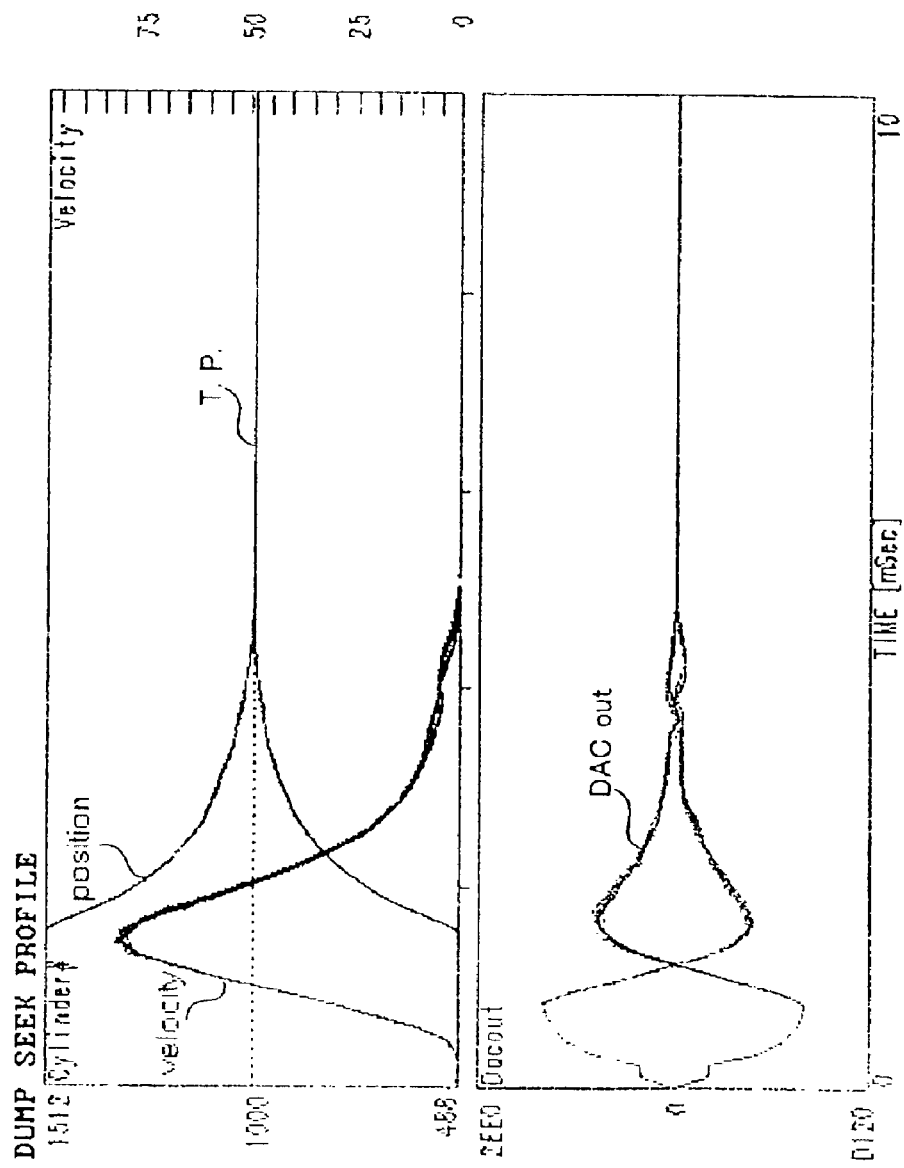
FIG. 9 is a graph showing the trajectory and the velocity of the magnetic head and a control current DAC out when a short seek was performed while feedback control parameters in the settling mode were set using a long seek as a reference.
Figure 10:
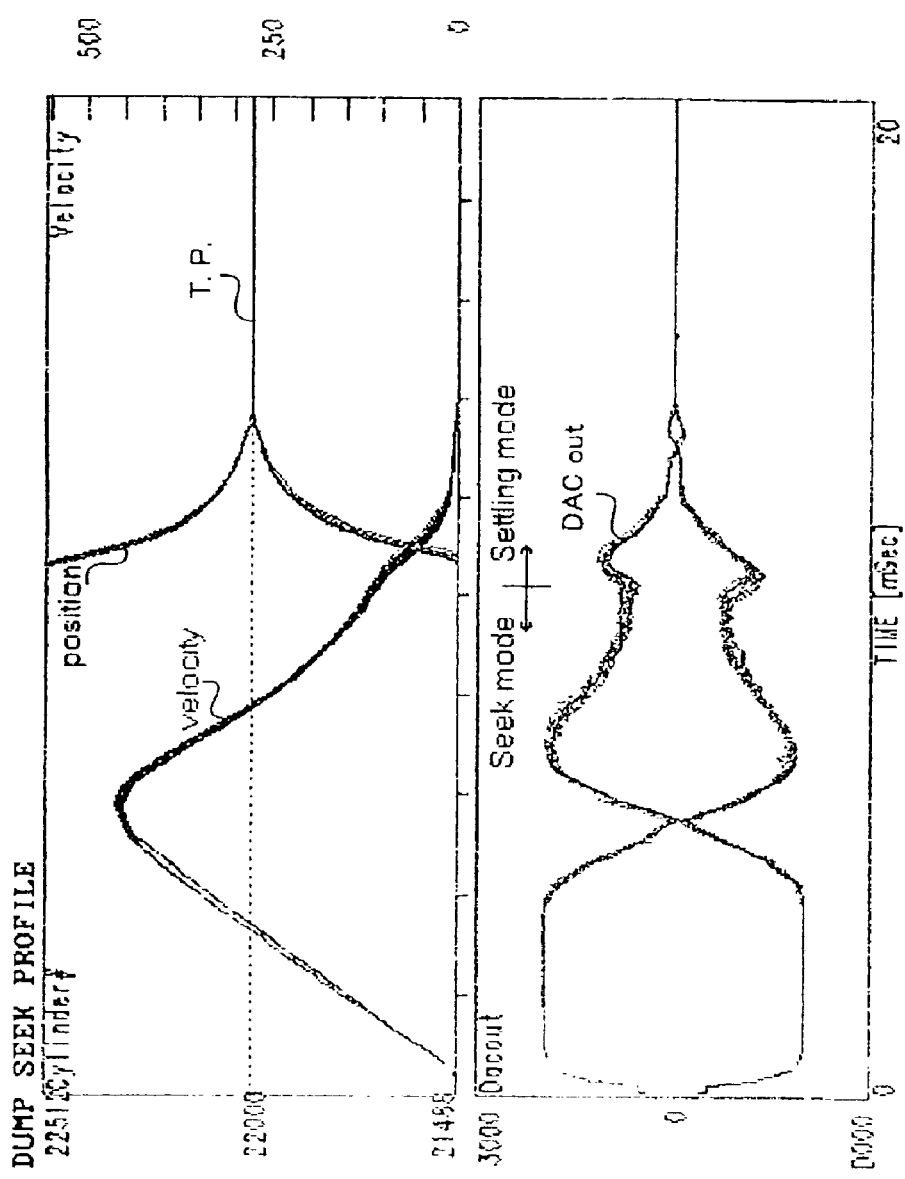
FIG. 10 is a graph showing the trajectory and the velocity of the magnetic head and the control current DAC out when a long seek was performed while the feedback control parameters in the settling mode were set using the long seek as a reference.

First, the experimental results in FIGS. 9 and 10 are obtained when the feedback control parameters in the settling mode are set using a long seek as a reference. The results in FIG. 9 are those obtained when a short seek is performed, and the results in FIG. 10 are those obtained when a long seek is performed.

As is shown in FIG. 9, when a short seek is performed while the feedback control parameters are set using a long seek as a reference, as is indicated by the curve "position" in the upper graph, an extended time is required for the magnetic head 4 to reach the target position T.P. This is because the gain is insufficient.

Naturally, as is shown in FIG. 10, when a long seek is performed while the feedback control parameters are set using the long seek as a reference, only a short time is required for the magnetic head 4 to reach the target position T.P. (see the upper graph), and the connected portion of the DAC out is satisfactory. As is described above, it is apparent from FIGS. 9 and 10 that when the feedback control parameters in the settling mode are set using the long seek as a reference, in the short seek the seek time is increased.

Figure 11:
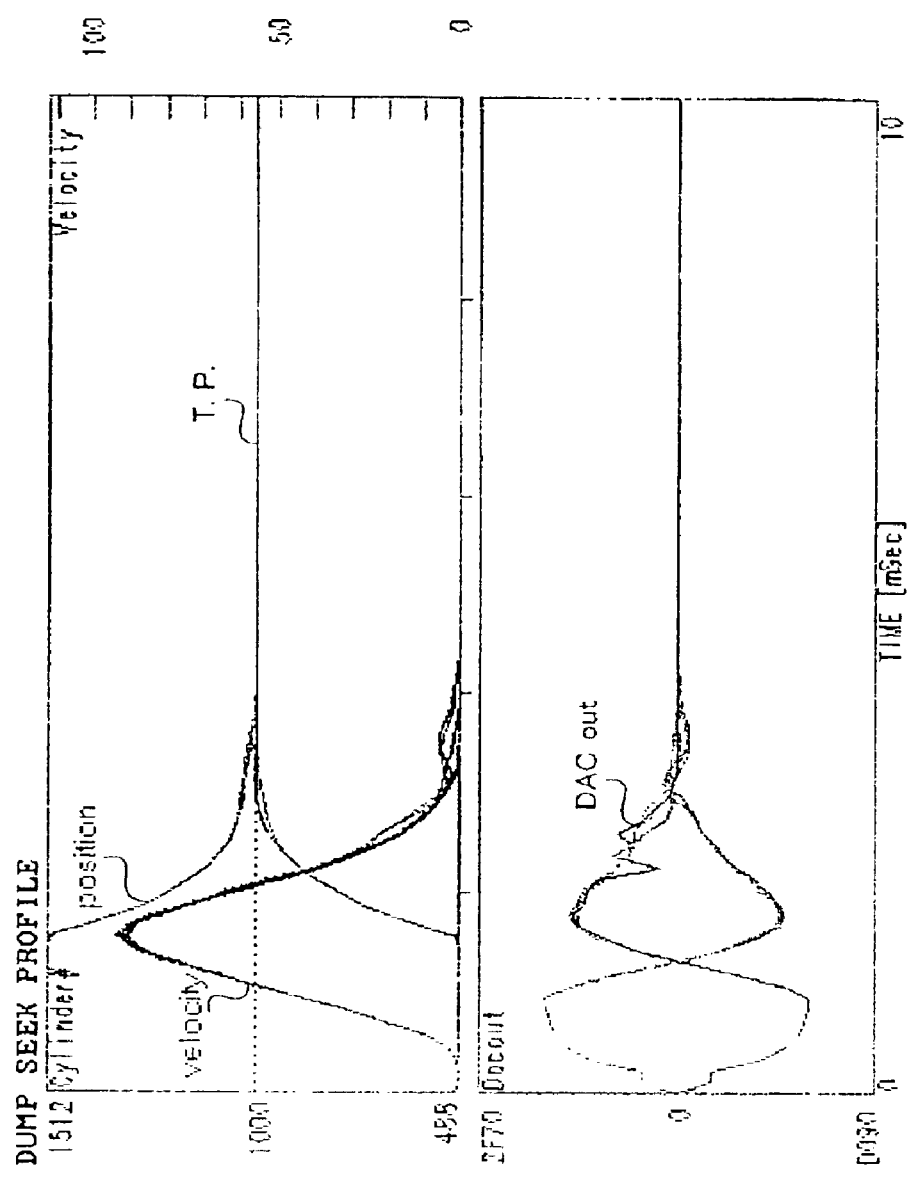
FIG. 11 is a graph showing the trajectory and the velocity of the magnetic head and the control current DAC out when a short seek was performed while the feedback control parameters in the settling mode were set using the short seek as a reference.
Figure 12:
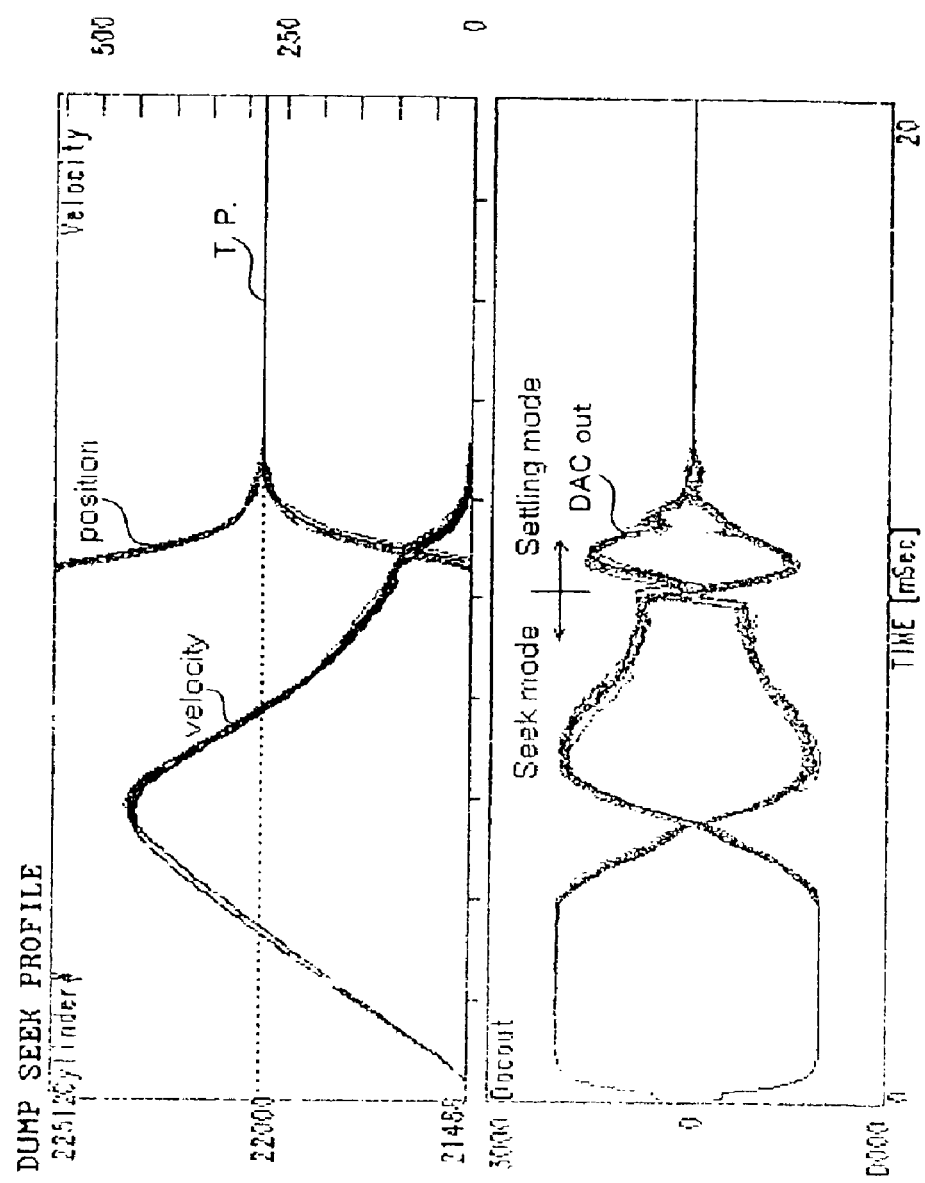
FIG. 12 is a graph showing the trajectory and the velocity of the magnetic head and the control current DAC out when a long seek was performed while the feedback control parameters in the settling mode were set using the short seek as a reference.

The graphs in FIGS. 11 and 12 show the experimental results when the feedback control parameters in the settling mode are set using a short seek as a reference. The results in FIG. 11 are those obtained when a short seek is performed, and the results in FIG. 12 are those obtained when a long seek is performed.

As is shown in FIG. 11, when a short seek is performed while the feedback control parameters are set using the short seek as a reference, the time required for the magnetic head 4 to reach the target position is reduced (see the upper graph).

As is shown in FIG. 12, when a long seek is performed while the feedback control parameters are set using the short seek as a reference, only a short time is required for the magnetic head 4 to reach the target position (see the upper graph); however, the occurrence of an obvious "continuity" problem has been observed when the seek mode was shifted to the settling mode (see the lower graph). As is described above, it is apparent from FIGS. 11 and 12 that, when the feedback control parameters in the settling mode were set using the short seek as a reference, in the long seek a "continuity" problem occurred.

Figure 13:
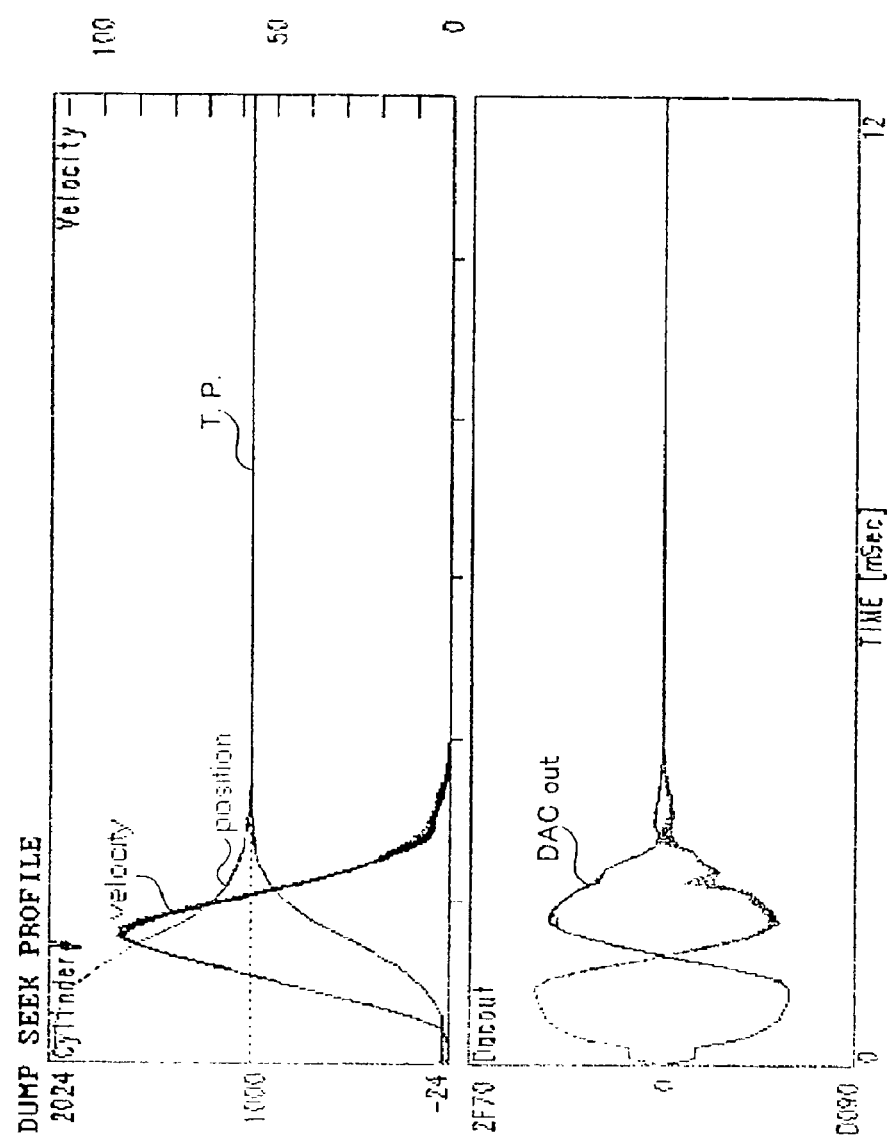
FIG. 13 is a graph showing the trajectory and the velocity of the magnetic head and the control current DAC out when a short seek was performed in accordance with the embodiment.
Figure 14:
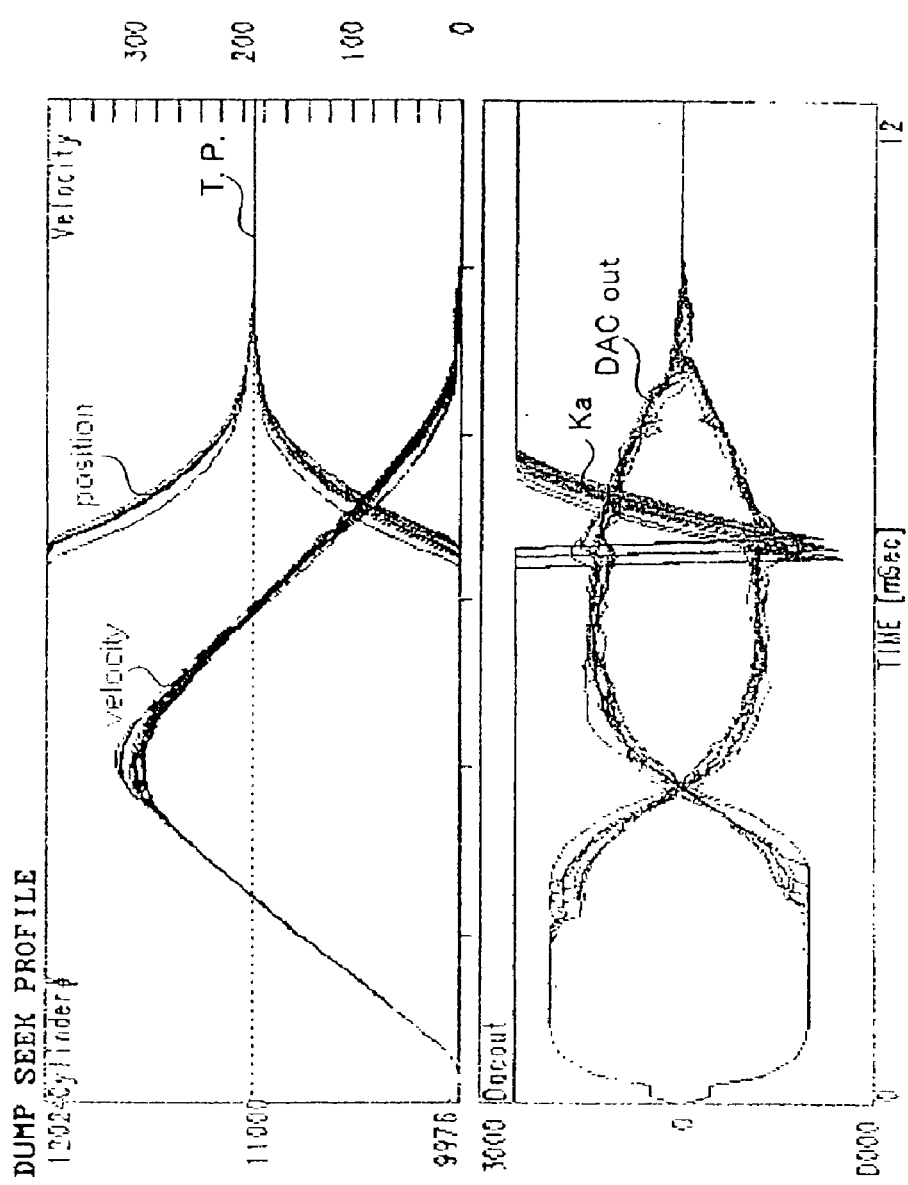
FIG. 14 is a graph showing the trajectory and the velocity of the magnetic head and the control current DAC out when a long seek was performed in accordance with the embodiment.

FIGS. 13 and 14 are graphs showing the experimental results obtained for the embodiment. In this embodiment, the feedback control parameters in the settling mode are set using a short seek as a reference, and the above described gain compensation is performed in the settling mode. The results in FIG. 13 are those obtained when a short seek is performed, and the results in FIG. 14 are those obtained when a long seek is performed. It is apparent from FIG. 13 that during the short seek the magnetic head 4 quickly reached the target position. It is further apparent from FIG. 14 that since gain compensation was performed using the compensation coefficient ka, which is shown in the lower graph in FIG. 14, when the seek mode was shifted to the settling mode, the "continuity" problem did not occur. When the compensation coefficient ka was changed, as needed, in accordance with the position of the magnetic head 4, i.e., the distance to the target position, the "continuity" problem could be resolved.

As is described above, according to the embodiment, the optimized positioning of the magnetic head 4 is performed during both the short seek and the long seek operations. In the above embodiment, the three modes, the seek mode, the settling mode and the following mode, have been prepared. However, the invention can also be applied for a hard disk drive 1 that has two control modes. In addition, the gain is compensated when the seek mode is shifted to the settling mode; however, gain compensation can also be performed when the settling mode is shifted to the following mode. In short, the present invention can be applied when in the feedback the positioning mode has to be changed, and an arbitrary number of modes and an arbitrary timing for the use of the modes can be employed. Furthermore, the invention can also be applied for a data storage device other than the hard disk drive 1.

As can be appreciated from the above description, it is an advantage of the invention that for the data storage device, the "continuity" problem occurring at the mode switching time and the contradiction existing between a short seek and a long seek can be resolved.

What is claimed is:

1. A data storage device comprising:
   a storage medium;
   a head, seeking over said storage medium and accessing a predetermined track;
   a positioning controller, outputting a control current for positioning said head, based on a first mode that is applied when a distance between said head position and said access position exceeds a distance B, a second mode that is applied when said distance is greater than distance A (A<B) and is equal to or less than said distance B, and a third mode that is applied when said distance is equal to or less than said distance A; and,
   a motor, positioning said head based on said control current output by said positioning controller,
   wherein, when the distance between the initial position of said head and the access position is greater than said distance B but is less than or equal to a distance C (B<C), said positioning controller positions said head using said first mode, said second mode and said third mode order, and
   wherein, when said distance between said initial position of said head and said access position is greater than said distance C, said positioning controller positions said head in accordance with said first mode, a compensated second mode, said second mode and said third mode order, and
   wherein said second mode is set on the assumption that, when an access instruction is received, said head will be located within a range of said second mode; and wherein said compensated second mode is obtained by compensating for said second mode so as to reduce the overshooting of said head.

* * * * *